PRODUCTION OF POTASSIUM SULFATE AND POTASSIUM CHLORIDE
Filed Oct. 9, 1963
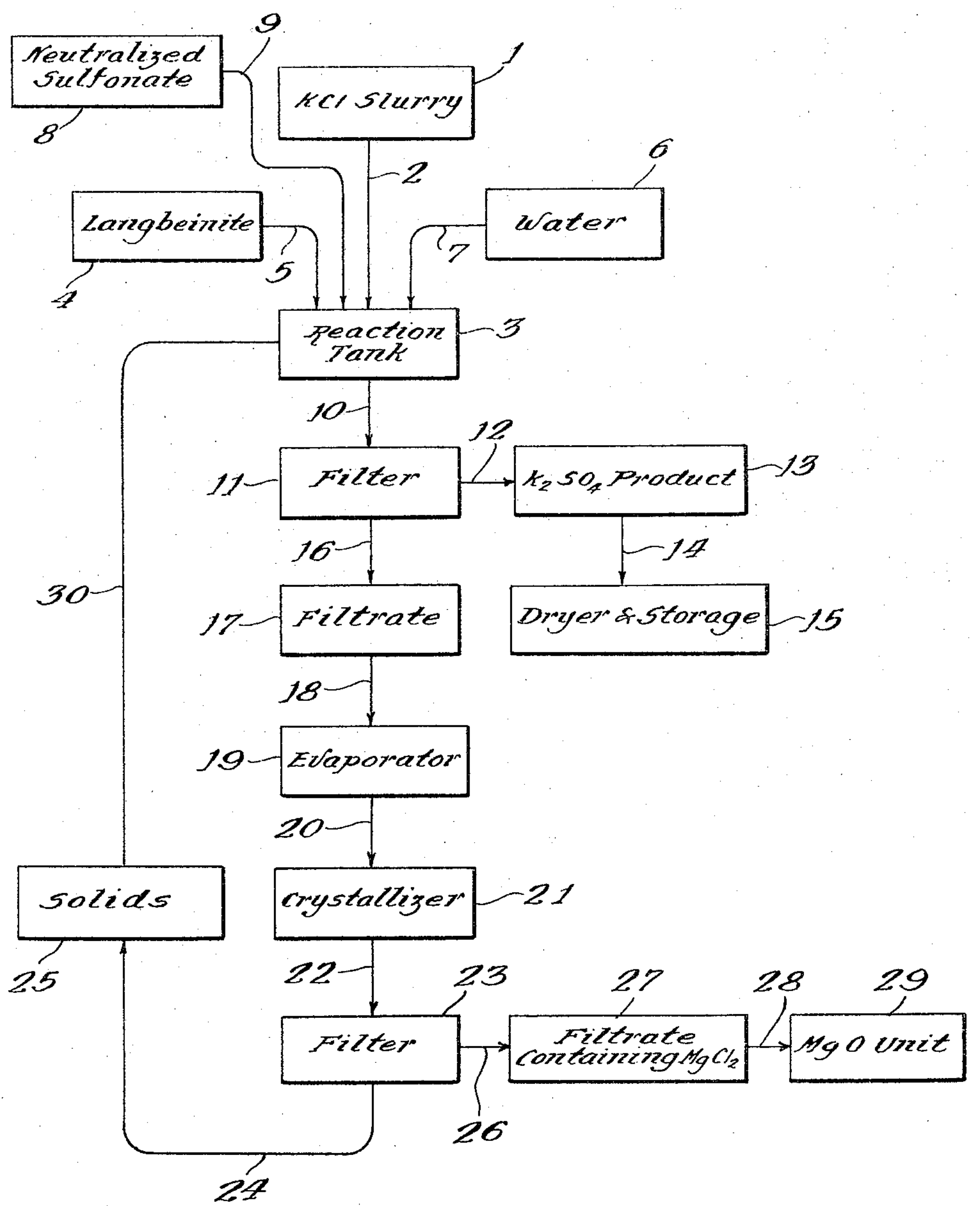
Inventor:
Alfred F. Nylander United States Patent Office 3,271,106

Patented Sept. 6, 1966

3,271,106

PRODUCTION OF POTASSIUM SULFATE AND POTASSIUM CHLORIDE

Alfred F. Nylander, Redwood City, Calif., assignor to International Minerals & Chemical Corporation, a corporation of New York Filed Oct. 9, 1963, Ser. No. 314,979
19 Claims. (Cl. 23—121)

This application is a continuation-in-part of application Serial No. 185,117, filed April 4, 1962 and now abandoned.

The present invention generally relates to the production of potassium sulfate. In a more particular aspect the present invention relates to improvements in a process for the production of potassium sulfate by the reaction in aqueous medium of potassium chloride with a potassium magnesium double sulfate. The invention also relates to the recovery of unreacted potassium chloride.

Complex salts containing magnesium sulfate and potassium sulfate occur naturally in many potash ores, such as the potash ores that are found in the European deposits and in the Permian Basin of the southwest area of the United States and mined chiefly in the Carlsbad district of New Mexico. Such complex salts may also be recovered from brines and may be prepared from potash compounds. It is frequently desirable to separately recover the potassium values and/or magnesium values from these complex salts and many processes to effect the separation have been developed.

The potassium values in langbeinite ores generally are recovered by reacting langbeinite with an aqueous solution of potassium chloride to produce potassium sulfate. Potassium sulfate crystals form in the solution and are recovered. The potassium sulfate mother liquor is frequently processed by one or another procedure to recover the magnesium values therefrom. This prior process for the preparation of potassium sulfate from complex salts containing magnesium sulfate and potassium sulfate has found wide acceptance and is commercially practiced.

However, although this prior process has found commercial acceptance, the potassium sulfate product is of relatively fine size, that is the crystals of potassium sulfate formed are of relatively small size. For many purposes, however, it is undesirable to use small size particles of potassium sulfate. For example, in the manufacture and utilization of fertilizers, which frequently include potassium sulfate, the use of such materials in finely divided form gives rise to caking and dusting problems so that granular materials are distinctly preferred, and the demand therefor has greatly expanded in recent years. A need has, therefore, existed for a method of preparing potassium sulfate in granular form, or in relatively large crystal form, so that it would be directly available to the market without any necessity for preparing it first in finely divided form and then converting it into a larger form by granulation, compaction, briquetting, or other such suitable agglomerating method. Accordingly, it is an object of the present invention to provide an improved method for the production of potassium sulfate.

It is another object of the present invention to provide an improved method for the preparation of potassium sulfate by the reaction of potassium chloride with solid potassium magnesium double sulfate.

It is a further object of the invention to provide an improved process for the production of potassium sulfate from langbeinite, in which the potassium sulfate is recovered in relatively large crystal size.

Yet another object of this invention is to provide an improved technique for recovering potassium chloride from aqueous solution in relatively large crystal size.

These and other objects and advantages of the present invention will be apparent to those skilled in the art as the description of the present invention progresses.

Generally described, the present invention is an improvement in a process for the production of potassium sulfate by the reaction in aqueous medium of potassium chloride with a solid potassium magnesium double sulfate. The improvement comprises effecting the reaction in the presence of specific neutralized sulfonate or neutralized sulfate agents. It has been discovered, and the present invention is partly based on this discovery, that when the reaction of potassium chloride with a solid complex salt containing magnesium potassium sulfate in aqueous solution to form potassium sulfate is effected in the presence of specific neutralized sulfonates or neutralized sulfates, a substantially larger amount of the potassium sulfate is produced as relatively larger size crystals. In other words, the presence of the neutralized sulfonate causes a substantially larger proportion of the total potassium sulfate product to occur in crystals of relatively larger size.

In a later process step, mother liquor rich in unreacted potassium chloride, after separation of the crystallized potassium sulfate, is treated by the addition of specific neutralized sulfonates or neutralized sulfates, and is cooled to crystallize potassium chloride. A substantially larger amount of the potassium chloride is recovered in relatively larger crystal sizes.

As hereinbefore set forth, complex salts containing magnesium potassium sulfate occur naturally in many potash ores. Examples of the complex salts contemplated as starting materials in the process of this invention are the potassium magnetism double sulfates, langbeinite ($2MgSO_4 \cdot K_2SO_4$), leonite ($MgSO_4 \cdot K_2SO_4 \cdot 4H_2O$), and schoenite ($MgSO_4 \cdot K_4SO_2 \cdot 6H_2O$). These complex salts may be utilized in pure or impure form, with the higher grades or purities being preferred.

The reaction of these complex salts with the potassium chloride is effected in an aqueous medium, however, it is necessary that solid salts, such as substantially dry complex salts, be admixed with the potassium chloride. Solid mixtures of two or more of the complex salts may also be used in the process of this invention. The complex salts are used in solid form and they are preferably in subdivided form smaller than 20 mesh, more preferably smaller than 100 mesh, and still more preferably at least 95% smaller than 200 mesh. The solid complex salts may, of course, be slurried in water or other aqueous solution, preferably a brine, before admixing with the langbeinite. The complex salt is used as a solid since it is desirable to maintain the amount of mother liquor from which the reaction product potassium sulfate is removed as low as possible.

Although in initiating the process only potassium chloride is used in the reaction mixture with the langbeinite or other double sulfate of potassium magnesium, and the brine, a slurry of recycled potassium salts, recovered from the mother liquor of the product, is preferably present in the reaction mixture and is employed once the process has been initiated. Potassium values present in the mother liquor from which the potassium sulfate product is separated are recovered as a mixture of leonite $$(K_2SO_4 \cdot MgSO_4 \cdot 4H_2O)$$

and potassium chloride.

The process is initiated by admixing the solid complex salt, preferably langbeinite, and potassium chloride with an aqueous solution, which is preferably a brine, substantially saturated with respect to potassium chloride. A potassium sulfate crystal product is formed and separated from the resultant mixture.

As hereinbefore set forth, in accordance with the present invention, when a specified neutralized sulfonate or neutralized sulfate agent is present in the reaction mixture, the resultant potassium sulfate is of substantially larger average crystal size. It is significant that the amount of the +65 mesh size crystals is significantly increased. Accordingly, the process is affected by the presence of the neutralized agent. It is, of course, necessary that the neutralized agent be present during the reaction of langbeinite with potassium chloride. The neutralized agent is introduced into the reaction zone in any suitable manner. For example, the neutralized agent may be admixed with the langbeinite, it may be admixed with the brine introduced into the reaction zone, it may be admixed with the potassium chloride, it may be introduced directly into the reaction zone, or any other suitable method may be used.

The neutralized agents suitable for use in accordance with this invention are the sodium, potassium and magnesium salts of acid sulfates and sulfonic acids of oleic acid, stearic acid, lauric acid, valeric acid, palmitic acid, capric acid, caproic, acid, caprilic acid, heptylic acid, and sylvic acid. The following specific compounds, not within the aforedefined class, are also useful in accordance with this invention. These compounds are: triethanol amine oleic acid sulfonate, disodium 4-dodecylated oxydibenzene sulfonate, and sodium dodecyl benzene sulfonate. Mixtures of the compounds defined individually or by class may be used.

Examples of specific compounds within the aforedefined class which are useful in accordance with this invention are:

Sodium salts:
- Sodium oleic acid sulfonate
- Sodium stearic acid sulfonate
- Sodium lauric acid sulfonate
- Sodium valeric acid sulfonate
- Sodium palmitic acid sulfonate
- Sodium capric acid sulfonate
- Sodium caproic acid sulfonate
- Sodium caprilic acid sulfonate
- Sodium heptylic acid sulfonate
- Sodium sylvic acid sulfonate
- Sodium oleic acid sulfate
- Sodium stearic acid sulfate
- Sodium lauric acid sulfate
- Sodium valeric acid sulfate
- Sodium palmitic acid sulfate
- Sodium capric acid sulfate
- Sodium sylvic acid sulfate Potassium salts:
- Potassium oleic acid sulfonate
- Potassium stearic acid sulfonate
- Potassium lauric acid sulfonate
- Potassium valeric acid sulfonate
- Potassium palmitic acid sulfonate
- Potassium capric acid sulfonate
- Potassium caproic acid sulfonate
- Potassium caprilic acid sulfonate
- Potassium heptylic acid sulfonate
- Potassium sylvic acid sulfonate
- Potassium oleic acid sulfate
- Potassium stearic acid sulfate
- Potassium lauric acid sulfate
- Potassium valeric acid sulfate
- Potassium palmitic acid sulfate
- Potassium capric acid sulfate
- Potassium sylvic acid sulfate Magnesium salts:
- Magnesium oleic acid sulfonate
- Magnesium stearic acid sulfonate
- Magnesium lauric acid sulfonate
- Magnesium valeric acid sulfonate
- Magnesium palmitic acid sulfonate
- Magnesium capric acid sulfonate
- Magnesium caproic acid sulfonate
- Magnesium caprilic acid sulfonate
- Magnesium heptylic acid sulfonate
- Magnesium sylvic acid sulfonate
- Magnesium oleic acid sulfate
- Magnesium stearic acid sulfate
- Magnesium lauric acid sulfate
- Magnesium valeric acid sulfate
- Magnesium palmitic acid sulfate
- Magnesium capric acid sulfate
- Magnesium sylvic acid sulfate The aforementioned compounds can be prepared by neutralizing the corresponding acid with sodium hydroxide, magnesium hydroxide or potassium hydroxide to form the corresponding salts. When the sodium salt is employed, in accordance with this invention, the neutralization should be carried out to a pH of 5 or greater. Preferably, the neutralization will be carried out to a pH in the range of 5 to 11. When the potassium or magnesium salts are employed, in accordance with this invention, the salts should be prepared by neutralizing the acid to a pH of at least 7, and preferably to a pH in the range of 7 to 11. It has been found that sodium salts neutralized to a pH lower than 5 and potassium or magnesium salts neutralized to a pH lower than 7, are not effective. The methods for preparing compounds useful in accordance with this invention are described in the prior art. Many of the acids useful in the preparation of the neutralized agents, and some of the salts themselves, particularly the sodium salts, are available commercially. The compounds useful in accordance with this invention may be prepared very simply, for example, by reacting oleic acid sulfonic acid or oleic acid acid sulfate with magnesium hydroxide and water in a Waring blender.

The neutralized agent is present in the reaction mixture in a small but effective amount. It has been determined that the neutralized agent should be present in an amount of at least 250 parts per million by weight based on the total weight of the mixture in the reaction zone. It is more preferable that the agent be present in a concentration of at least 400 parts per million. The upper limit is not as critical as the lower limit, however, concentrations in excess of about 2,000 parts per million are generally uneconomical and, therefore, are not preferred.

The resulting mother liquor from which the product potassium sulfate has been separated will contain dissolved salts comprising magnesium chloride, potassium chloride, potassium sulfate and magnesium sulfate as well as some sodium chloride, the sodium having been introduced with one or more of the starting materials. This mother liquor is concentrated to a point, such that on cooling, the liquor approaches saturation with respect to the magnesium salt carnallite. A salt mixture composed principally of potassium chloride with some leonite, crystallizes after evaporation and cooling of the mother liquor and is separated from the cooled solution. In accordance with one aspect of this invention, an aforedefined selected neutralized sulfonate or sulfate in the amount of 200 to 2,000 parts per million is added to the hot mother liquor prior to cooling and crystallizing potassium chloride. Product potassium chloride, containing some leonite impurities, is separated from the cooled mother liquor. The potassium chloride recovered is substantially purer than the potassium chloride fed to the process. The addition of selected neutralized sulfonate or sulfate results in a substantial increase in average particle size of the recovered potassium chloride. Thus, a marketable potassium chloride of improved purity and increased particle size can be recovered for sale. The increased particle size also facilitates separation of the crystals from the mother liquor. The recycled potassium salts generally have a $K_2O$ content of about 23%. By the term "recycled salts" as used in the description and claims is meant the mixture of potassium chloride and leonite which was separated from the mother liquor from which the potassium sulfate crystals were removed. In order to obtain optimum production of potassium sulfate per unit of langbeinite raw material processed, it may be desired to recycle substantially all of the mixture of recycled salts.

In carrying out a preferred embodiment of the process, the salt mixture containing leonite and potassium chloride, recovered by evaporation and cooling of the mother liquor from which the product has been separated, is admixed with a brine substantially saturated with respect to potassium chloride at a temperature between about 25° C. and about 35° C. The brine is suitably prepared by leaching langbeinite ore or sylvite ore or sylvite product obtained from the flotation of sylvinite ore with water. The resulting slurry is rapidly heated to a temperature between about 80° C. and about 95° C. and any solid phase sodium chloride is immediately separated from the hot solution, for example, by filtration. The resulting solution which is saturated with potassium chloride is cooled to a temperature between about 25° C. and about 60° C., preferably between about 30° C. and about 55° C. and the resulting slurry is mixed with ground langbeinite in a reaction zone or tank.

Sufficient water is added to the langbeinite reaction mixture to reduce the sodium chloride content below its saturation point in the mixture of products resulting from the reaction. Sufficient dilution is necessary, because as the reaction of the langbeinite proceeds, magnesium chloride is formed, and as the concentration of magnesium chloride in the mixture increases, the solubility of sodium chloride in the solution decreases. Generally, the reaction mixture contains between about 4 and about 5 parts of water per part of langbeinite.

The langbeinite reaction mixture is agitated or stirred until the reaction has proceeded to substantial completion. Generally between about 4 hours and about 6 hours is sufficient time for substantial completion of the reaction. The potassium sulfate salt as crystals is separated from the mother liquor by any suitable means such as, for example, by filtration, decantation, centrifugation, etc. Sodium sulfate is the chief impurity present in the potassium sulfate product. Sodium sulfate does not, however, impair the usefulness of this product in fertilizers.

The mother liquid from which the product is separated is concentrated, for example by evaporating at a temperature between about 60° C. and about 108° C. The mother liquor is concentrated to such point that when the concentrated liquor is cooled over a range of between about 35° C. and about 50° C., for example, to a temperature between about 25° C. and about 60° C., leonite and potassium chloride are crystallized from the slurry. In a preferred embodiment, the liquor is concentrated at about 98° C. in a submerged combustion evaporator to a magnesium chloride concentration between about 15% and about 18%. The concentrated liquor is cooled to about 50° C. and the mixture of salts comprising potassium chloride and leonite, with some sodium chloride contamination, which crystallizes from the cooled slurry are separated from the liquor, for example, by filtration or as an underflow from a conventional thickener apparatus. The liquor from which the solids have been separated has about the same composition as mother liquors rejected from conventional processes in which potassium sulfate is prepared by base exchange. This liquor may be processed for the recovery of magnesium values in accordance with known methods.

The mixture of salts separated from the mother liquor is preferably recycled to the langbeinite reaction step as hereinbefore described.

For a more complete understanding of the instant novel process reference may be made to the drawing which is a flow sheet of the process.

Referring now to the drawing, an aqueous slurry 1, the solid phase of which is potassium chloride and the liquid phase saturated with respect to potassium chloride is conducted to reaction tank 3 by means of line 2. Solid langbeinite (95%–200 mesh) 4 enters the reaction tank 3 by means of line 5 and water 6 is conveyed to the same by line 7. The neutralized sulfonate 8 of this invention enters the reaction tank 3 by means of line 9. The mixture is agitated at a temperature between about 45° C. and about 55° C. until the reaction proceeds to substantial completion, that is about six hours. Although only one reaction tank is illustrated, more reaction tanks with a countercurrent process flow may be used. Such countercurrent processing is known to the art and therefore is not described herein. Thereafter, the reactant mixture is transferred to filter 11 by means of line 10, and the potassium sulfate product 13 is removed from the filter 11 by line 12 and is conveyed to dryer and storage 15 by means of line 14.

The mother liquor or filtrate 17 is removed from filter 11 by means of line 16 and is conducted to evaporator 19 maintained at about 98° C., by means of line 18. Neutralized sulfonate is preferably also introduced to evaporator 19. The concentrated filtrate is transferred by line 20 to crystallizer 21 where it is cooled to about 50° C. The resulting slurry is conveyed to filter 23 by line 22 where solids 25 comprising potassium chloride and leonite, along with some sodium chloride, are separated and removed by line 24. The filtrate 27, which contains magnesium chloride, is removed by line 26 and is conducted by line 28 to a magnesium oxide preparation unit 29. The solids 25 are recycled by means of line 30 to the reaction tank 3.

In order to give a fuller understanding of the invention, but with no intention to be limited thereto, the following specific examples are given:

*Example I*

A test was conducted in which 900 grams of refined potassium chloride was slurried into 3,000 grams of water. The slurry was heated to a temperature of 90° C. and 1,038 grams of ground langbeinite (95%–200 mesh) was stirred into the mixture and the mixture was maintained in an agitating condition for six hours. In this test, denominated Test 1, no agent was added to the reaction mixture. In a comparative Test 2 substantially the same conditions were maintained except that 3 cc. sodium oleic acid sulfonate commercially sold by the Tennessee Corporation under the trademark "Sul-Fo-Nate OA-5" was utilized.

After a reaction time of six hours the final temperature of the reaction mixture was about 40° C. The potassium sulfate crystals formed in the reaction mixture were separated by filtration and analyzed and given a size analysis. The results are given below in Table I.

TABLE I

| Wet Screen | Test 1 Control | | Test 2, 3 Ml. Sul-Fo-Nate | |
|---|---|---|---|---|
| | Grams | Percent | Grams | Percent |
| +28 | 6 | .6 | 648 | 67.0 |
| 28 x 65 | 168 | 17.2 | 16 | 1.7 |
| −65 | 803 | 82.2 | 303 | 31.3 |
| | 977 | 100.0 | 967 | 100.0 |

The plus 65 mesh solids from the run containing Sul-Fo-Nate was of high purity and exceeded 52% by weight $K_2O$.

*Example II*

Example I was repeated at substantially the same conditions except that 800 parts per million of sodium oleic acid sulfonate was used. The results are as follows:

TABLE II

| Mesh | Wt. Percent $K_2SO_4$ Control | 800 p.p.m. OA5 |
|---|---|---|
| +28 | 0 | 2.5 |
| +35 | .6 | 37.5 |
| +48 | 11.0 | 62.5 |
| +65 | 52.5 | 77.0 |
| +100 | 74.5 | 87.0 |
| +200 | 92.5 | 96.0 |
| −200 | 7.5 | 4.0 |

The above two examples clearly illustrate that the presence of the sulfonate agent produced a potassium sulfate product in which the crystals were of substantially larger size as compared to the product prepared in the absence of the agent.

Substantially identical tests were conducted at various concentrations of the sodium salt of sulfonated castor oil. Concentrations of 95, 190, 231, 238, 285, 317, 380, 397, 476, 571, 750 and 1,142 were tested. In all cases at concentrations above 400 parts per million the resultant potassium sulfate product had crystals in the larger size range. Below 400 parts per million the increase in the average size of the potassium sulfate product was markedly less.

*Example III*

Various sulfonates were used in a process for producing potassium sulfate crystals by reacting potassium chloride with langbeinite in aqueous solution. The reaction conditions in each test were mantained substantially the same so that the sulfonates could be evaluated. The results are given below in Table III.

TABLE III

| Sulfonate | Amount Used, p.p.m. | Weight Percent +65 Mesh $K_2SO_4$ Crystals |
|---|---|---|
| None, Control | None | None |
| Sodium oleic acid sulfonate | 540 | 87.2 |
| Triethanol amine oleic acid sulfonate | 500 | 63 |
| Disodium 4-dodecylated oxydibenzene sulfonate | 720 | 96 |
| Sodium sylvic acid sulfonate | 660 | 84.0 |
| Sodium dodecyl benzene sulfonate | 4,000 | 51.4 |
| Sodium isopropyl napthalene sulfonate | 600 | None |
| Potassium oleic acid sulfonate | 1,000 | None |
| Oleic acid sulfonate | 600 | None |
| Ammonium oleic acid sulfonate | 600 | None |
| Sodium heptadecyl sulfate | 600 | None |

*Example IV*

The effectiveness of sodium oleic acid sulfonate to increase the crystal size of recovered potassium chloride was demonstrated by dissolving 7964 grams of potassium chloride into 13,236 grams of water at a temperature of 80° C. The solution was divided into four 5,000 gram portions, and sodium oleic acid sulfonate was added to three of the portions, the other portion being used as a control. The conditions and results are set out in Table IV.

TABLE IV

| Test | Sul-Fo-Nate OA5 | Grams KCl | Grams $H_2O$ | Temperature | | Wet Screen Analyses | | |
|---|---|---|---|---|---|---|---|---|
| | | | | Initial | Final | +28 | −28 +65 | −65 |
| 1 | 0, Control | 1,691 | 3,309 | 80 | 30 | 10.4 | 86.9 | 2.7 |
| 2 | 3 Ml | 1,691 | 3,309 | 80 | 30 | 61.3 | 37.0 | 1.7 |
| 3 | 3 Ml | 1,691 | 3,309 | 80 | 30 | 88.2 | 11.5 | .2 |
| 4 | 6 Ml | 1,691 | 3,301 | 80 | 30 | 95.9 | 3.7 | .4 |

The crystal size distribution is seen to be displaced towards +28 mesh, with corersponding decreases in the quantities of −28 +65 and −65 mesh crystals.

Further tests were carried out in which potassium chloride was rapidly crystallized from aqueous solution by cooling from an initial temperature of 95° C. to a final temperature of 28° C. under applied vacuum. The addition of selected sulfonate again produced a dramatic increase in crystal size, although small crystals were formed in both the control and sulfonate-containing samples, as compared with the results obtainable with more gradual cooling.

*Example V*

A magnesium salt of oleic acid sulfonic acid was prepared by mixing together 500 grams of commercial oleic acid sulfonic acid (65% oleic acid sulfonic acid, 7% free $H_2SO_4$, 5% free oleic acid, 23% $H_2O$) 140 grams of 48% aqueous magnesium hydroxide, and 250 milliliters of water in a Waring blender. The reaction product, which had a pH of about 7, was filtered to recover the salt.

The effectiveness of the reagent thus prepared was tested by dissolving 1050 grams of KCl in 3000 milliliters of $H_2O$, heating to 45° C., and adding 3.25 milliliters of magnesium oleic acid sulfonate and 1038 grams of −200 mesh langbeinite. The mixture was reacted at 45–50° C. for 6 hours. The solids formed were recovered, washed, and dried. The dried solids were screened to produce 506 grams of plus 65 mesh and 420 grams of −65 mesh material. The fractions analyzed as follows:

TABLE V

| | Percent $K_2O$ | Percent Mg | Percent Cl |
|---|---|---|---|
| +65 Mesh | 52.39 | | 0.28 |
| −65 Mesh | 29.20 | 9.00 | 1.46 |

*Example VI*

A potassium salt of oleic acid sulfonic acid was prepared by mixing together 500 grams of commercial oleic acid sulfonic acid, 90 grams of potassium hydroxide pellets, and 450 grams of water. The final pH of the reaction product was about 6.5.

Potassium chloride and langbeinite were reacted under the conditions set forth in Example V except that 5 milliliters of potassium oleic acid sulfonate prepared as above described, were used instead of the magnesium salt. No +65 mesh crystals were recovered upon screening the solids.

*Example VII*

A sample of the potassium oleic acid sulfonate produced in Example VI was reacted with additional potassium hydroxide to produce a final product having a pH of about 11. The more fully neutralized potassium oleic sulfonate was recovered.

The reaction of potassium chloride and langbeinite described in Example V was repeated with the exception that 4 milliliters of potassium oleic acid sulfonate, neutralized to a pH of about 11 was substituted for the magnesium salt. After about two hours reaction time the formation of +65 mesh crystals was observed visually.

*Example VIII*

The reaction between potassium chloride and langbeinite described in Example V is repeated, with the exception that 3 milliliters of sodium oleic acid sulfate is substituted for the magnesium sulfonate used in Example V. The solids produced by the reaction are recovered, dried, and screened, and it is determined that more than 60% of the recovered solids are +65 mesh.

Neutralized sulfonates useful in accordance with this invention are available commercially, and they can be prepared, for example, as described in U.S. Patent No. 2,743,288.

The description of the invention utilized specific reference to certain process details; however, it is to be understood that such details are illustrative only and not by way of limitation. Other modifications and equivalents of the invention will be apparent to those skilled in the art from the foregoing description.

The embodiments of the invention in which an exclusive property or privilege is claimed are defined as follows:

1. In a process for the production of potassium sulfate by the reaction of potassium chloride with a solid complex salt containing magnesium potassium sulfate, in aqueous medium, the improvement comprising carrying out the reaction in the presence of at least 250 parts per million of a neutralized agent of the group consisting of sodium, potassium, and magnesium salts of monosulfonic acids of oleic acid, stearic acid, lauric acid, valeric acid, palmitic acid, capric acid, caproic acid, caprilic acid, and sylvic acid; the sodium potassium, and magnesium salts of acid sulfates of oleic acid, stearic acid, lauric acid, valeric acid, palmitic acid, capric acid, caproic acid, caprilic acid, and sylvic acid; the compounds triethanol amine oleic acid sulfonate, disodium 4-dodecylated oxydibenzene sulfonate, and sodium dodecyl benzene sulfonate; and mixtures thereof.

2. The method in accordance with claim 1 in which said agent is sodium oleic acid sulfate.

3. The method in accordance with claim 1 in which said agent is potassium oleic acid sulfonate.

4. The method in accordance with claim 1 in which said agent is magnesium oleic acid sulfonate.

5. The improvement of claim 1 wherein said neutralized sulfonate comprises sodium oleic acid sulfonate.

6. The improvement of claim 1 wherein said neutralized sulfonate comprises triethanol amine oleic acid sulfonate.

7. The improvement of claim 1 wherein said neutralized sulfonate comprises disodium 4-dodecylated oxydibenzene sulfonate.

8. The improvement of claim 1 wherein said neutralized sulfonate comprises sodium sylvic acid sulfonate.

9. The improvement of claim 1 wherein said neutralized sulfonate comprises sodium dodecyl benzene sulfonate.

10. In the crystallization of potassium chloride from an aqueous medium, the improvement comprising incorporating in said medium 250 to 2,000 parts per million of a neutralized agent of the group consisting of sodium, potassium, and magnesium salts of monosulfonic acids of oleic acid, stearic acid, lauric acid, valeric acid, palmitic acid, capric acid, caproic acid, caprilic acid, and sylvic acid; the sodium, potassium, and magnesium salts of acid sulfates of oleic acid, stearic acid, lauric acid, valeric acid, palmitic acid, capric acid, caproic acid, caprilic acid, and sylvic acid; the compounds triethanol amine oleic acid sulfonate, disodium 4-dodecylated oxydibenzene sulfonate, and sodium dodecyl benzene sulfonate; and mixtures thereof prior to crystallizing the potassium chloride therefrom.

11. The process in accordance with claim 10 in which said potassium chloride is crystallized by cooling said aqueous medium.

12. The method in accordance with claim 11 in which said aqueous medium is cooled from about 90° C. to about 30° C.

13. The method in accordance with claim 12 in which said aqueous medium contains potassium, magnesium, sodium chloride, and sulfate ions, and is substantially saturated with potassium chloride at about 90° C.

14. The method in accordance with claim 10 in which said agent is potassium oleic acid sulfonate.

15. The method in accordance with claim 10 in which said agent is potassium oleic acid sulfonte.

16. The method in accordance with claim 10 in which said agent is magnesium oleic acid sulfonate.

17. The improvement of claim 10 wherein said neutralized sulfonate comprises sodium oleic acid sulfonate.

18. The improvement of claim 10 wherein said neutralized sulfonate comprises triethanol amine oleic acid sulfonate.

19. The improvement of claim 10 wherein said neutralized sulfonate comprises sodium sylvic acid sulfonate.

No references cited.

OSCAR R. VERTIZ, *Primary Examiner.*

EARL C. THOMAS, *Examiner.*

UNITED STATES PATENT OFFICE

CERTIFICATE OF CORRECTION

Patent No. 3,271,106 September 6, 1966

Alfred F. Nylander

It is hereby certified that error appears in the above numbered patent requiring correction and that the said Letters Patent should read as corrected below.

Column 2, line 32, for "magnetism" read -- magnesium --; line 34, for "$(MgSO_4 \cdot K_4SO_2 \cdot 6H_2O)$" read -- $(MgSO_4 \cdot K_2SO_4 \cdot 6H_2O)$ --; column 3, line 20, for "caproic," read -- caproic --; column 5, line 45, for "liquid" read -- liquor --; column 10, line 29, for "potassium" read -- sodium --; line 31, for "sulfonte" read -- sulfonate --.

Signed and sealed this 1st day of August 1967.

(SEAL)
Attest:

EDWARD M. FLETCHER, JR.
Attesting Officer

EDWARD J. BRENNER
Commissioner of Patents